United States Patent [19]

Hanrahan

[11] Patent Number: 5,606,935
[45] Date of Patent: Mar. 4, 1997

[54] HOLDING TANK SYSTEM

[75] Inventor: Michael G. Hanrahan, Runaway Bay, Australia

[73] Assignee: Austmarine Pty. Ltd., Queensland, Australia

[21] Appl. No.: 331,471

[22] PCT Filed: Apr. 29, 1993

[86] PCT No.: PCT/AU93/00185

§ 371 Date: Oct. 31, 1994

§ 102(e) Date: Oct. 31, 1994

[87] PCT Pub. No.: WO93/21760

PCT Pub. Date: Nov. 11, 1993

[30] Foreign Application Priority Data

Apr. 29, 1992 [AU] Australia .................. PL2127

[51] Int. Cl.⁶ .................................................. A01K 63/02
[52] U.S. Cl. ............................................................ 119/203
[58] Field of Search ................................. 119/201, 203, 119/227, 248, 249, 259, 260, 261, 226, 211, 245, 264

[56] References Cited

U.S. PATENT DOCUMENTS

| | | | |
|---|---|---|---|
| 3,025,831 | 3/1962 | Berardi | 119/211 |
| 3,557,753 | 1/1971 | Dantoni | 119/260 |
| 3,687,111 | 8/1972 | Epper | 119/201 |
| 3,785,342 | 1/1974 | Rogers | 119/264 X |
| 4,861,465 | 8/1989 | Augustyniak | 119/227 X |
| 4,957,623 | 9/1990 | Henzlik | 119/264 X |
| 5,310,427 | 5/1994 | Manome | 119/201 |
| 5,366,618 | 11/1994 | Foster . | |

FOREIGN PATENT DOCUMENTS

| | | |
|---|---|---|
| 0192577 | 8/1986 | European Pat. Off. . |
| 2550917 | 3/1985 | France . |
| 2215330 | 8/1990 | Japan . |
| 2194121 | 3/1988 | United Kingdom . |
| 2226940 | 7/1990 | United Kingdom . |
| 8701010 | 2/1987 | WIPO . |

Primary Examiner—Robert P. Swiatek
Assistant Examiner—Yvonne R. Abbott
Attorney, Agent, or Firm—Panitch Schwarze Jacobs & Nadel, P.C.

[57] ABSTRACT

A holding tank system suitable for storage of live fish, crustacea and other aquatic animals includes a holding tank assembly and a transportable support, such as a skid or base for supporting the holding tank assembly during transportation as well as installation. At an installation site, the holding tank assembly is installed with the base forming part of the holding tank system. The holding tank system also includes a filter tank assembly and a housing for water conditioning apparatus which may also be supported on the base. Optionally the filter tank assembly may be supported on a separate base both for transportation and installation.

21 Claims, 10 Drawing Sheets

HOLDING TANK SYSTEM

FIELD OF THE INVENTION

This invention relation relates to a holding tank system suitable for storage of live fish crustacea and other aquatic animals.

BACKGROUND ART

One holding tank which is known for the abovementioned purpose is Australian Patent Specification 595542 and this refers to a holding tank having a layer of particulate material or shellgrit to function as a biological filter which is supported on a perforated tray. The shellgrit may also carry a culture of bacteria which may denitrify contaminants, e.g. faeces produced by aquatic animals in the holding tank. There is also provided water conditioning means associated with the holding tank which includes a pump, a refrigeration unit and water spray unit. The pump may draw water from the tank through the shellgrit and into a conduit which passes through the refrigeration unit and subsequently the spray unit which returns the water to the tank. The water spray may break up any floating scum material into small pieces which may be removed by a skimmer associated wit the tank. The skimmer is connected to the water conditioning means by appropriate valving.

The holding tank arrangement shown in Patent Specification 595542 is efficient in operation and relatively economic to operate. However, the holding tank system as described in Patent 595542 was a fixed or permanent installation and this meant that it was necessary to build a concrete slab so as to support the holding tank with the filter tank being supported on the ground and the components of the water conditioning apparatus also being supported on the ground adjacent the concrete slab. It was a time consuming process to fully install the holding tank system of Patent 595542 since it was not only necessary to form the concrete slab but also set up the water conditioning means including interconnecting the components of the water conditioning means to each other as well as to the filter tank and the holding tank.

The conventional holding tank system as described above especially if a large holding tank was required often needed to be completely installed in concrete and this provided disadvantages to the owner of the holding tank if it was necessary that he transferred his operation to another site. This was frequently necessary if the owner of the holding tank rented or leased the factory which incorporates the holding tank. In such circumstances the demolition which was required to remove the tank could sometimes exceed a week or more and this involved a substantial loss to the owner owing to lack of storage space for the aquatic animals. It will also be borne in mind that it is frequently the case that when a business is expanding or in the reverse situation when a business is contracting that frequent changes of premises may be necessary and this will means that the abovementioned problems in regard to fixed holding tanks for aquatic animals may be exacerbated.

SUMMARY OF INVENTION

It is therefore is an object of the present invention to provide a holding tank system for marine animals which may alleviate at least to some extent the aforementioned difficulties associated with the prior art.

Accordingly, in one aspect of the invention there is provided a holding tank system for storage of live seafood including:
(i) a holding tank assembly; and
(ii) a transportable support base for said holding tank assembly; and
(iii) a plurality of conduits located beneath said support base for liquid communication with said holding tank assembly.

In another aspect of the invention there is provided a method of installation of a holding tank system including a holding tank assembly which includes the steps of:
(i) mounting the holding tank assembly onto a transportable support base wherein a plurality of conduits associated with the holding tank assembly are located beneath said transportable support base; and
(iii) installing the transportable support base at the installation site whereby said transportable support base forms a permanent part of the holding tank system.

In cases where the holding tank assembly is relatively small e.g. less than 2.5 tonne in seafood capacity weight both the holding tank assembly and a filter tank assembly may be supported by a common transportable support base.

However, where the holding tank is relatively large e.g. greater than 2.5 tonne in seafood capacity weight the holding tank assembly and the filter tank assembly may be supported by different or separate transportable support bases.

Therefore in relation to the present invention "transportable support base" may include a common support base for both the holding tank assembly and the filter tank assembly as well as separate bases.

The transportable support base may also support a housing which may accommodate suitable water conditioning apparatus such as a pump, filters such as activated charcoal filters, a pre-filter and cooling apparatus inclusive of refrigeration assemblies.

The support base may be provided with a plurality of attachment points or locations whereby crane hooks, for example, may be attached. Preferably the support base may comprise a support frame suitably having a plurality of longitudinal frame members interconnected by a plurality of transverse frame members. In another possible arrangement the base may comprise a single sheet or support plate. However, the former arrangement of longitudinal frame members and transverse frame members are preferred.

The support base may also include a plurality of longitudinal recesses for accommodation of the plurality of conduits.

The filter tank assembly is preferably formed from fibre glass or other suitable material and this may include shellgrit or other suitable filter media.

Both the holding tank assembly and the filter tank assembly may be transported separately from each other or on a common support base as described above. However, in the case of separate transportation the holding tank body and the filter tank body may be connected in any suitable manner at the installation site so that the filter tank body may be included in a water conditioning circuit which interconnects the filter tank assembly and the holding tank assembly. In one form this may be accomplished by connecting a forward line or conduit and a return line or conduit of the filter tank assembly with a suction line or conduit of the holding tank assembly.

BRIEF DESCRIPTION OF THE DRAWINGS

Reference may now be made to a preferred embodiment of the invention as shown in the attached drawings wherein.

DETAILED DESCRIPTION OF THE INVENTION

Figure 1:
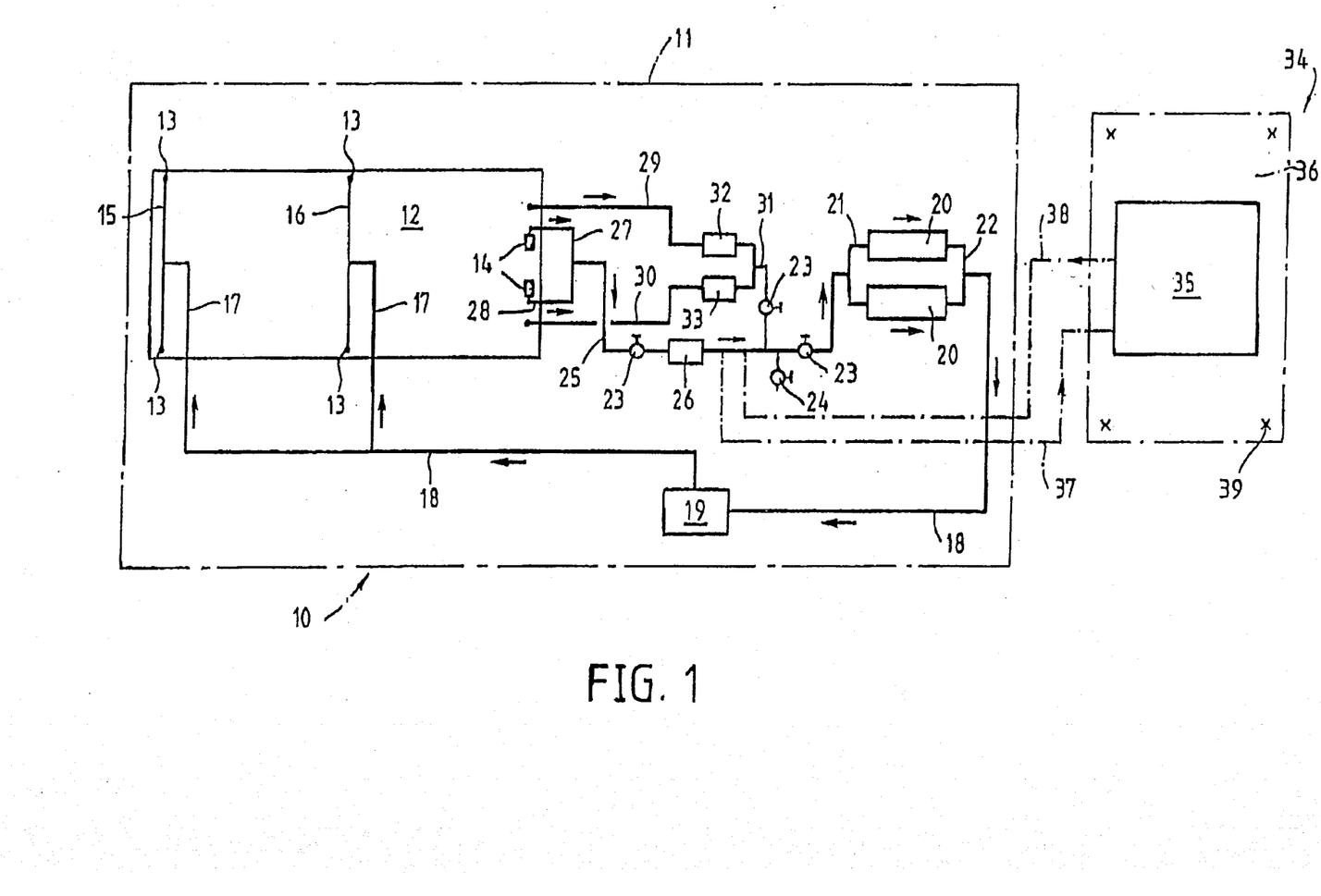
FIG. 1 is a schematic flow diagram of a holding tank system constructed in accordance with the invention showing the water conditioning circuit.

In the drawings there is shown a holding tank system 10 mounted on mounting frame 11. The holding tank system 10 includes holding tank 12, spray nozzle locations 13, outlets 14, manifolds 15 and 16, inlet conduits 17 as well as inlet conduit 18, pump 19, refrigeration assemblies 20 and associated conduits 21 and 22, valves 23, drain 24, suction conduit 25, pre-filter 26, suction lines 27 and 28 and skimmer outlet conduits 29, 30 and 31 and activated carbon filters 32 and 33.

There is also shown filter tank assembly 34 including filter tank 35, mounting frame or base 36, and filter tank return conduit 37 and filter tank forward or exit conduit 38. Both conduits 37 and 38 are shown in phantom and are connected to suction line 25 in a manner described hereinafter. Mounting frame 36 has four attachment points 39 for attachment to crane hooks (not shown) in a similar manner as described for mounting frame 11 in FIG. 2.

Figure 2:
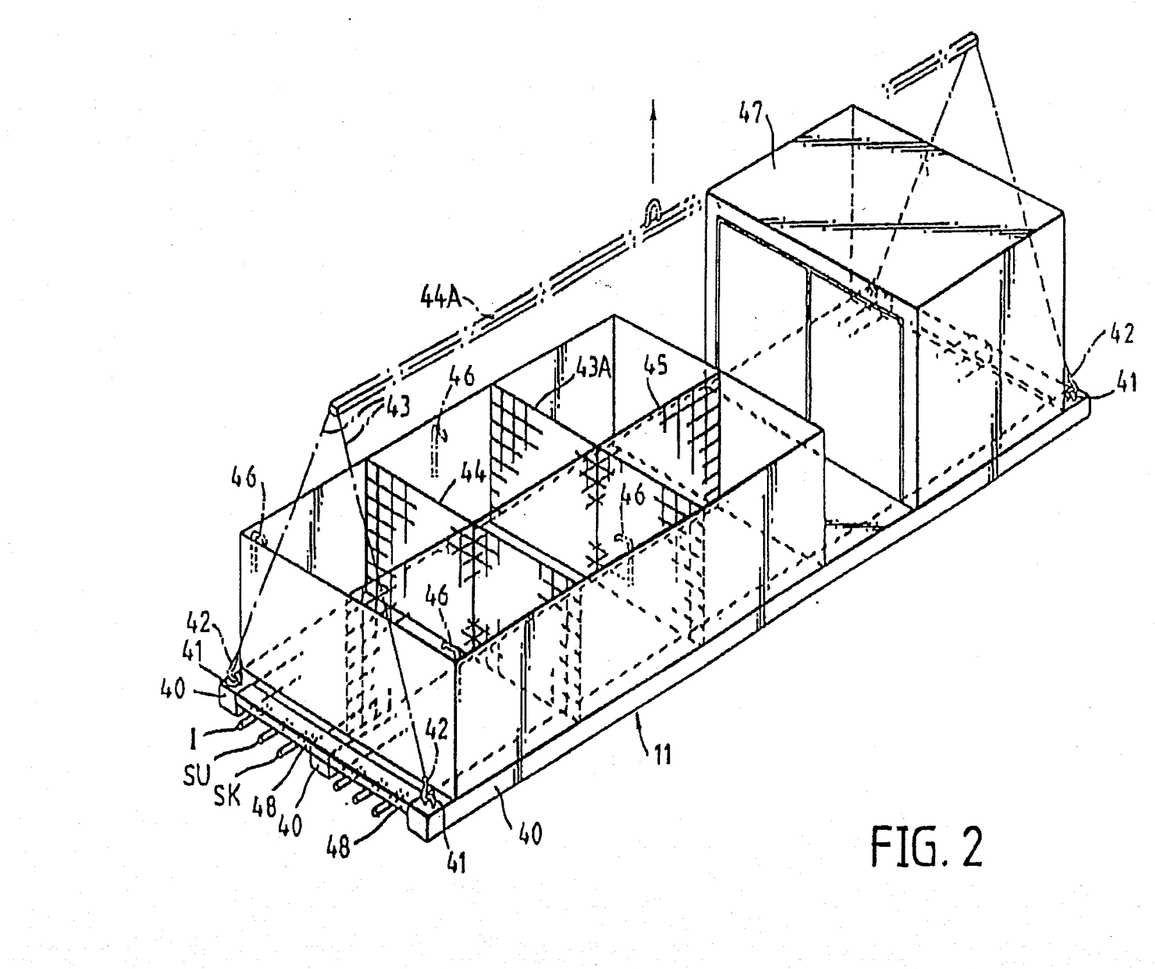
FIG. 2 is a perspective view of the holding tank body and water conditioning apparatus housing carried by a mounting frame or base.

In FIG. 2 there is shown holding tank assembly 10 and mounting frame 11 including longitudinal frame members 40. There are also shown attachment points 41 for crane hooks 42 attached to crane cables 43 which in turn are attached to spreader bar 44A of a crane (not shown). The holding tank 12 includes mesh screens 43A, 44 and 45 and spray nozzles 46. There is also shown housing 47 for the water conditioning apparatus already described in relation to FIG. 1. Also shown are longitudinal recesses 48 for inlet conduits (I), suction conduits (SU) and skimmer conduits (SK).

Figure 3:
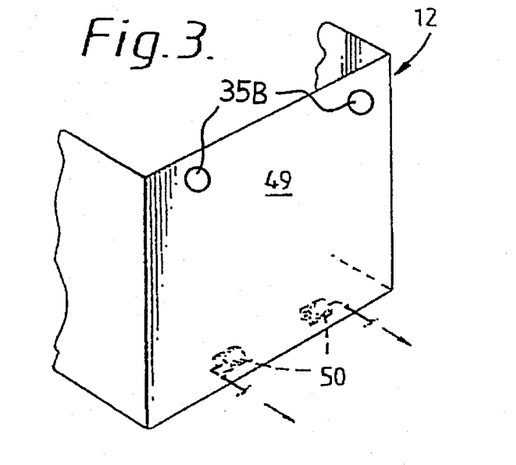
FIG. 3 is a perspective view of part of the holding tank showing outlets for the suction return conduits.

In FIG. 3 there is shown an end wall 49 of holding tank 12 having perforated cylinders 50 which function as outlets of the holding tank 12. Skimmer outlets 35B are also shown. Cylinders 50 may be lifted out of tank 12 when required for maintenance purposes.

Figure 4:
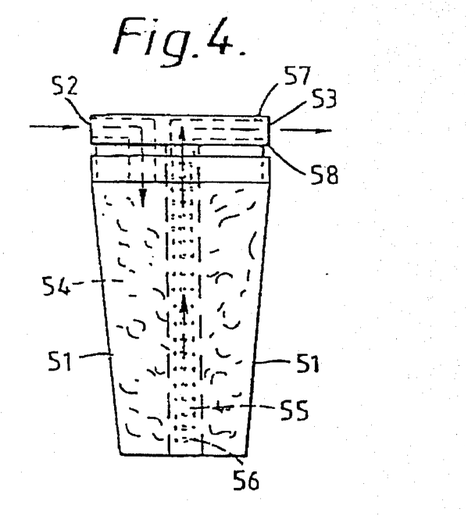
FIG. 4 is a view of a filter for use in the present invention.
Figure 4A:
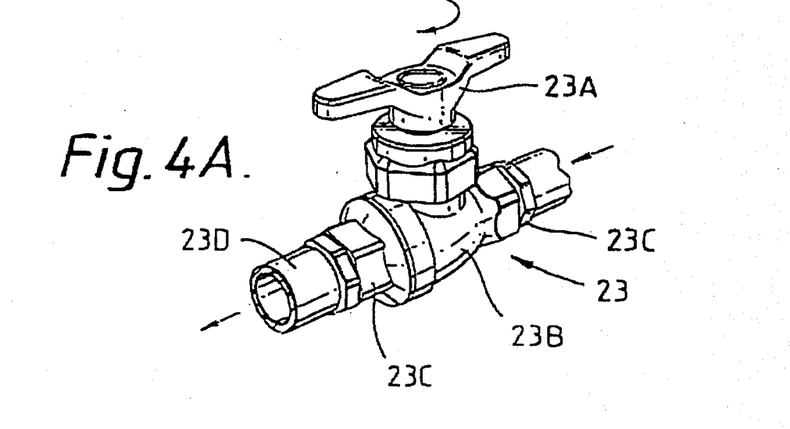
FIG. 4A is a perspective view of a valve for use in the water conditioning apparatus.

In the filter shown in FIG. 4 there is shown 2 filter cartridge provided with an inlet 52 and outlet 53. The inlet 52 leads water into filter cartridge 51 and into compartment 54 filled with activated carbon. Compartment 54 is separated from central passageway 55 by a perforated wall 56. The perforations in wall 56 serve to allow water to flow therethrough while retaining the activated carbon in compartment 54. The filter cartridge 51 is provided with a lid or cover 57 screw threadedly attached to the cartridge at 58. This enables the cartridge 51 to be subject to frequent maintenance checks by removal of cover 57 when required. To allow this to be accomplished valves 23 may be incorporated in the water conditioning circuit with a movable valve stem 23A as shown in FIG. 4A which may be pivoted from an ON position to an OFF position and vice versa when required. The valve 23 may also include a valve body 23B and screw threaded ferrules 23C for attachment to conduit 23D. The valve stem 23A has a ball (not shown) at a lower end which may selectively close or open conduit 23D. The flow of water through the filter cartridge is shown by the arrows in full outline in FIG. 4.

Figure 5:
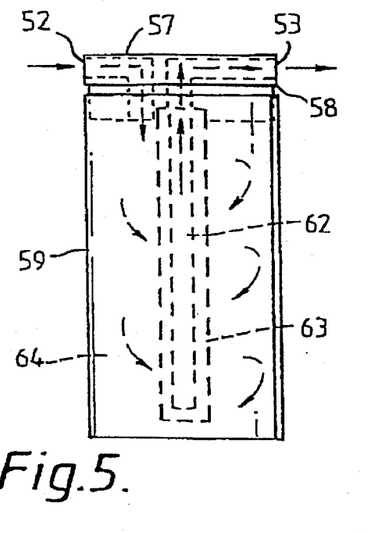
FIG. 5 is a view of another type of filter for use in the present invention.

A modified filter cartridge for use in the invention is shown in FIG. 5. This cartridge 59 includes inlet 52, outlet 53 and cover 57 as described above in relation to FIG. 4 as well as a perforated inner body 62 located within cartridge 59 and a nylon mesh 63A. The direction of water flow is clearly shown by the arrows in full outline. The filter cartridge 59 is preferred for use over filter cartridge 51 because it reduces the possibility of sludge forming at a top surface of the water level. Activated carbon particles are retained in chamber 64.

Figure 6:
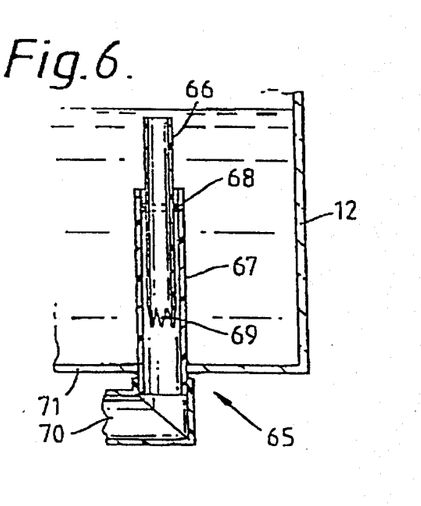
FIG. 6 is a view of a skimmer assembly for use with the present invention.

The skimmer assembly 65 for use with the holding tank is shown in FIG. 6. This includes an upper tube 66 telescopically engagable in lower tube 67 in association with O-ring seal 68. Upper tube 66 is provided with a plurality or scallops or recesses 69 which enhance the flow rate of liquid through tubes 66 and 67. The skimmer assembly 65 is thus height adjustable to suit different operative levels of water within holding tank 12. Lower tube 67 is connected to conduit 70 through the base wall 71 of the holding tank 12 as shown. There also may be used a sealing ring or gasket (not shown) which surrounds tube 67 as it passes through base wall 71.

Figure 7:
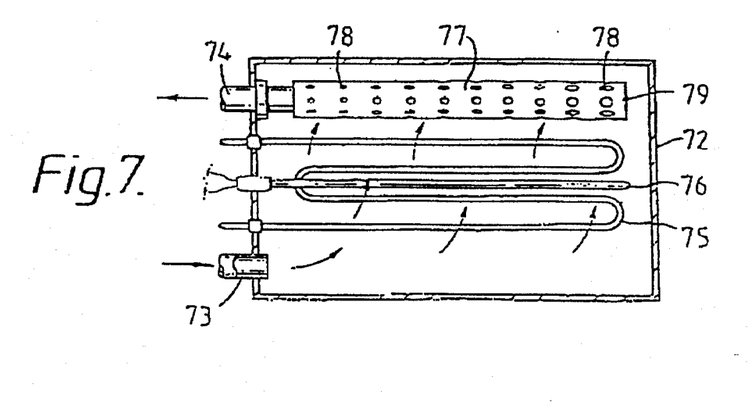
FIG. 7 is a view of a refrigeration unit for use with the present invention.

In FIG. 7 there is shown a typical refrigeration assembly which be used in the water conditioning circuit. This includes a housing 72, inlet 73, outlet 74, refrigeration evaporator coil 75, temperature probe 76, and barrel 77 having a series of openings 78 which may range from relatively large adjacent end 79 to relatively small adjacent outlet 74. This feature improves the flow water of liquid through housing 72.

Figure 8:
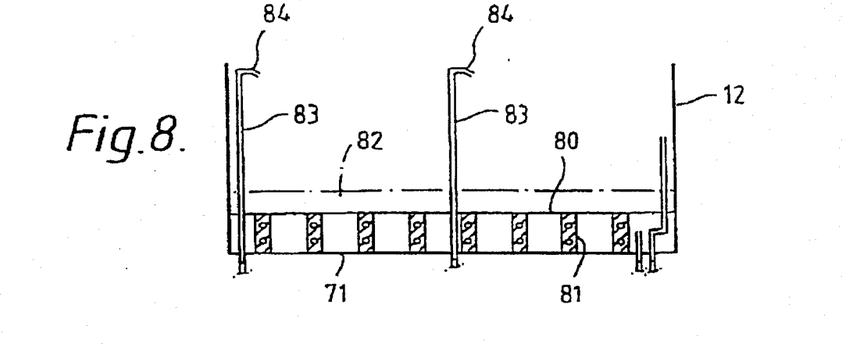
FIG. 8 is a view of the holding tank for use with the present invention.

In FIG. 8 there is shown the holding tank 12 having a perforated tray 80 supported by perforated upstands 81 bonded to base wall 71 by adhesive. The tray 80 supports a layer of filtering material 82 such as shellgrit and the like. The holding tank 12 is also supplied with a number of vertical rise tubes 83 each having a spray outlet nozzle 84.

Figure 9:
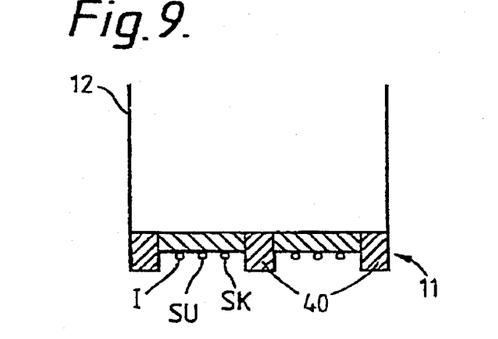
FIG. 9 is a sectional view of the mounting base for the holding tank body.

In FIG. 9 there is shown a sectional view of the mounting frame or base 11 with longitudinal recesses 48 for conduits I, SU and SK as previously described.

Figure 10:
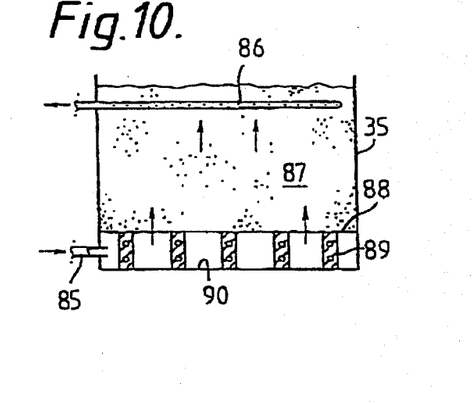
FIG. 10 is a view of the filter tank for use with the present invention.

In FIG. 10 there is shown a detailed view of filter tank 35 having inlet 85 and perforated outlet tube 86. A layer of shellgrit 87 is supported on perforated tray 88 which is supported on perforated upstands 89 bonded to the base surface 90 of tank 35.

In some cases it may be appropriate during installation to remove perforated upstands 81 from holding tank 12 and attach them to filter tank 35 by adhesive so that they correspond to perforated upstands 89. This provides more capacity for holding tank 12.

Figure 11:
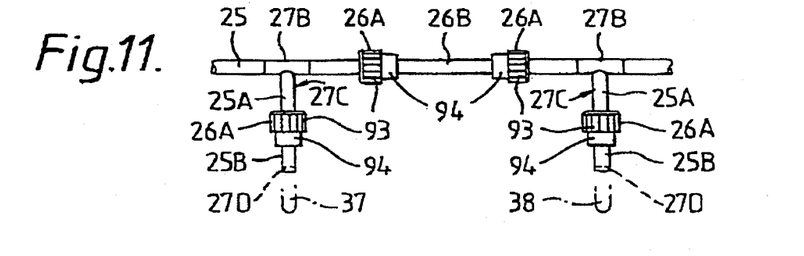
FIGS. 11, 11A, 11B and 11C show the method of interconnection between the holding tank body and the filter tank.
Figure 11A:
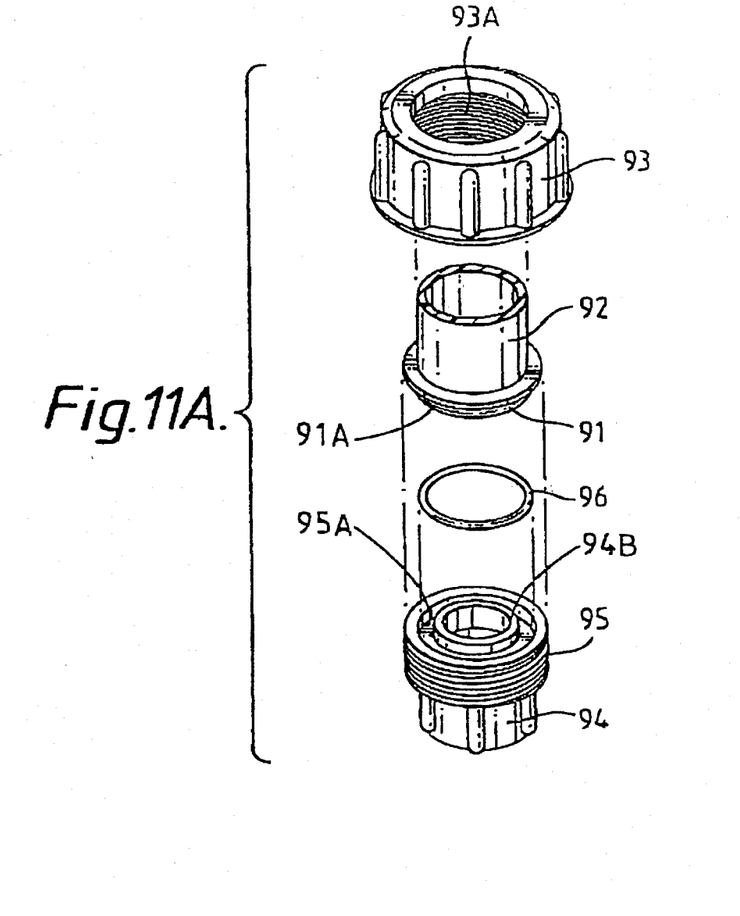

In FIG. 11 there is shown how existing suction conduit 25 of the water conditioning apparatus is structured prior to attachment of conduits 37 and 38 from filter tank 34. Thus, suction conduit 25 includes T pieces 27B and depending portions 27C. Each depending portion 27C includes a barrel union 26A illustrated in detail hereinafter in FIG. 11A and conduit 25 includes barrel unions 26A interconnecting conduit 26B wit the remainder of conduit 25. Each portion 27C includes upper part 25A and lower part 25B which is plugged at 27D. Barrel unions 26A as shown in FIG. 11A comprise a milled outer or female ferrule 93 with internal thread 93A which may be engaged with inner or male component 94 having external thread 95. Also shown in sealing ring 96.

There is also shown conduit component 92 having a lower flange 91 and tapered part 91A which engages with sealing ring 96 which is retained in recess 95A of male component 94 surrounding conduit component 94B so that when male component 94 is connected to female component 93, conduit compartment 92 communicates with conduit component 94B. In FIG. 11 for example conduit component 92 corresponds with conduit 25A and conduit component 94 corresponds with conduit 25B.

Figure 11B:
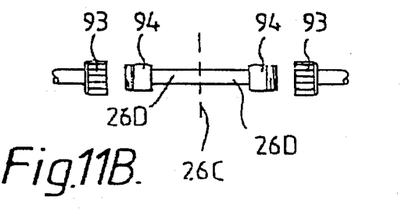
Figure 11C:
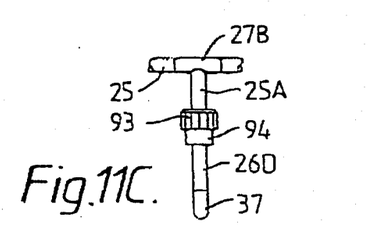

As shown in FIG. 11B when it is desired to attach conduits 37 and 38 to conduit 25 the central conduit 26B is removed from conduit 25 by unscrewing male components 94 of barrel unions 26A. Subsequently each lower part 25B is removed by unscrewing inner or male component 94 from a respective female ferrule 93 and discarded. Subsequently central conduit 26B is cut in half at 26C and each remaining portion 26D is attached to upper part 25A by screw threadedly attaching male component 94 to female component 93. Conduits 37 and 38 may then be attached to portions 26D by adhesive or other suitable means.

Figure 12:
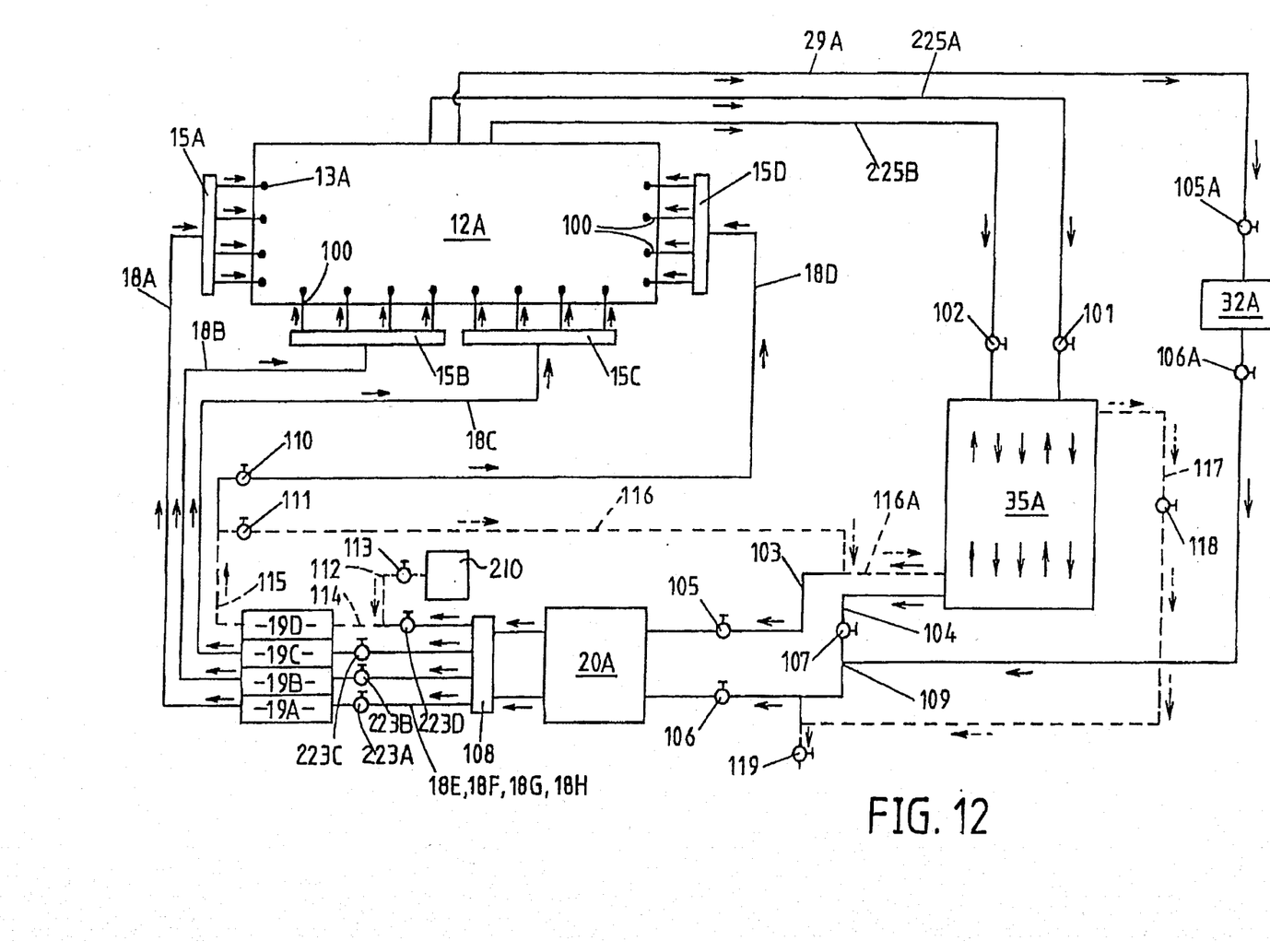
FIG. 12 is a schematic flow diagram of a holding tank system constructed in accordance with another aspect of the present invention.

In FIG. 12 there is described a modified water conditioning apparatus for use with the present invention. The water conditioning apparatus as shown in FIG. 12 has special application to avoid removal of filtering media in the filter tank when this becomes necessary due to the shellgrit or other filtering media in the filter tank becoming blocked resulting in a restricted flow rate with ocean silts. In this regard, it is to be borne in mind that in filter tanks there is often large amounts of filtering material such as 8 tonne or more. It is not a practical proposition to replace the shellgrit with fresh material or indeed to remove the shellgrit and wash same and then place the washed shellgrit in the filter tank. Such a task is extremely labour intensive and very time consuming and thus is not economic. Washing of existing shellgrit in a filter tank can often lead to periods of 3 days or more when the filter is idle.

The water conditioning apparatus shown in FIG. 12 may assist in overcoming this problem and thus provides a holding tank assembly including
(i) a holding tank assembly;
(ii) a filter tank assembly; and
(iii) water conditioning apparatus which conditions water flowing between the holding tank assembly and the filter tank assembly characterised in that flow of water through the filter tank assembly which occurs when the water conditioning apparatus is in a normal operative cycle may be reversed to wash the filtering material contained in the filter tank assembly to ensure an unrestricted flow of water through the filter tank assembly.

The reversing of water flow through the filter tank assembly may be accomplished suitably by providing a fresh water intake which may be introduced into a conduit associated with a pump of the water conditioning apparatus and by opening a fresh water intake valve and closing all normal valves of the water conditioning apparatus to allow water to flow through a fresh water conduit so that it may enter the filter tank assembly through the filter tank assembly outlet or other suitable access location and exit from the filter tank assembly the top thereof. This flow of fresh water through the tank may elevate the shellgrit from the base of the filter tank so that the particles of shellgrit are thoroughly cleaned. This also maintains existing bacterial culture in the filter tank assembly which grows on the surface of the shellgrit. If the shellgrit is not cleaned at regular intervals the existing bacterial culture may become impaired or adversely affected by the abovementioned contaminants.

In this aspect of the invention, suitable there is provided a plurality of pumps each having a separate inlet conduit to the holding tank assembly whereafter the water may exit from the holding tank assembly by a common outlet. Preferably the fresh water intake is introduced into a suction return line of the water conditioning circuit but this is not essential.

In the apparatus shown in FIG. 12 there is illustrated holding tank 12A, spray outlets 13A, manifolds 15A, 15B, 15C and 15D and associated inlet conduits 18A, 18R, 18C and 18D each associated with a respective pump 19A, 19B, 19C and 19D as shown. Each pump 19A, 19B, 19C and 19D has associated therewith a respective valve 22A, 223B, 223C and 223D. Also with each manifold 15A, 15B, 15C and 15D is provided a series of inlet conduits 100 as shown. There is also shown suction return conduits 225A and 225B and a skimmer return conduit 29A. Suction return conduits 25A and 225B pass through valves 101 and 102 and subsequently pass through filter tank 35A before passing through outlet conduits 103 and 104 which communicate with refrigerator assembly 20A as shown. There is also shown valves 105, 106 and 107. After passing through the refrigerator assembly 20A conduits 103 and 204 communicate with manifold 108 which forms conduits 18E, 18F, 18G and 18H.

The skimmer return line 29A passes through charcoal filter 32A as shown before communicating with line 104 at 109. The conduit or line 29A also passes through valves 105A and 106A.

In accordance with this particular aspect of the invention there is provided a fresh water intake 210 and associated conduit 112 which passes through valve 113 into conduit 18E. This is shown in phantom outline to clearly distinguish from the normal operational cycle described above wherein direction of fluid flow is shown by arrows in full outline in the normal operational cycle. The water flow functions in the same manner as already described in detail in FIG. 1 and as discussed above.

In contrast, when it is desired to actuate the circuit for flushing out shellgrit in filter tank 35A, valves 223A, 223B, 223C and 223C are closed as well as valves 110, 101, 102, 107, 106, and 105. Tis provides a circuit which includes fresh water intake 210, conduit 112, valve 113 which is closed during the normal operative cycle, conduit 114, conduit 115, conduit 116, conduit 116A, filter tank 35A, conduit 117, valve 118 which is closed during the normal operative cycle and drain 119. Conduit 116A is part of conduit 103 and is open only when valve 105 is closed.

By the return flow of water which flows along the circuit in phantom outline, as described above, this enables the shellgrit or other filtering material to be easily and efficiently washed and thus this substantially minimises the problems of the prior art holding tank systems as described above.

It will also be appreciated from the foregoing that another aspect of the present invention concerns the holding tank assembly per se having the aforesaid fixed base or mounting frame thereby providing a transportable assembly. This assembly may be utilised by a holding tank owner using the existing filters that are included in the water conditioning apparatus (e.g. filters 51 or 59) until such time as the throughput capacity of the holding tank assembly has increased sufficiently to warrant use of an external filter tank assembly (e.g. 34) which may be connected to the holding tank assembly 11 as described above.

Another advantage of the holding tank assembly of the present invention compared to the prior art such as Australian Patent Specification 595542 is that the holding tank assembly described in that specification in practice, especially in relation to wholesale applications, has necessitated the use of two pumps wherein one pump is included in the skimmer line and the other pump in the inlet line. In contrast the present invention, as exemplified in FIG. 1, only requires the use of one pump and thus in terms of capital outlay is a cheaper proposition.

The invention in another embodiment may include a holding tank system which may comprise a mounting frame or mounting base which may support a holding tank assembly, a filter tank assembly, as well as a housing for accommodating suitable water conditioning apparatus such as a pump, filters and cooling apparatus inclusive of refrigeration assemblies. This holding tank system may be used in a retail installation which has a capacity of less than 2.5 tonnes. By contrast the holding tank system shown in FIGS. 1–11 suitably has a capacity of greater than 2.5 tones.

Preferably a mounting base is utilised on the same type of construction already discussed above in FIG. 1–11.

Figure 13:
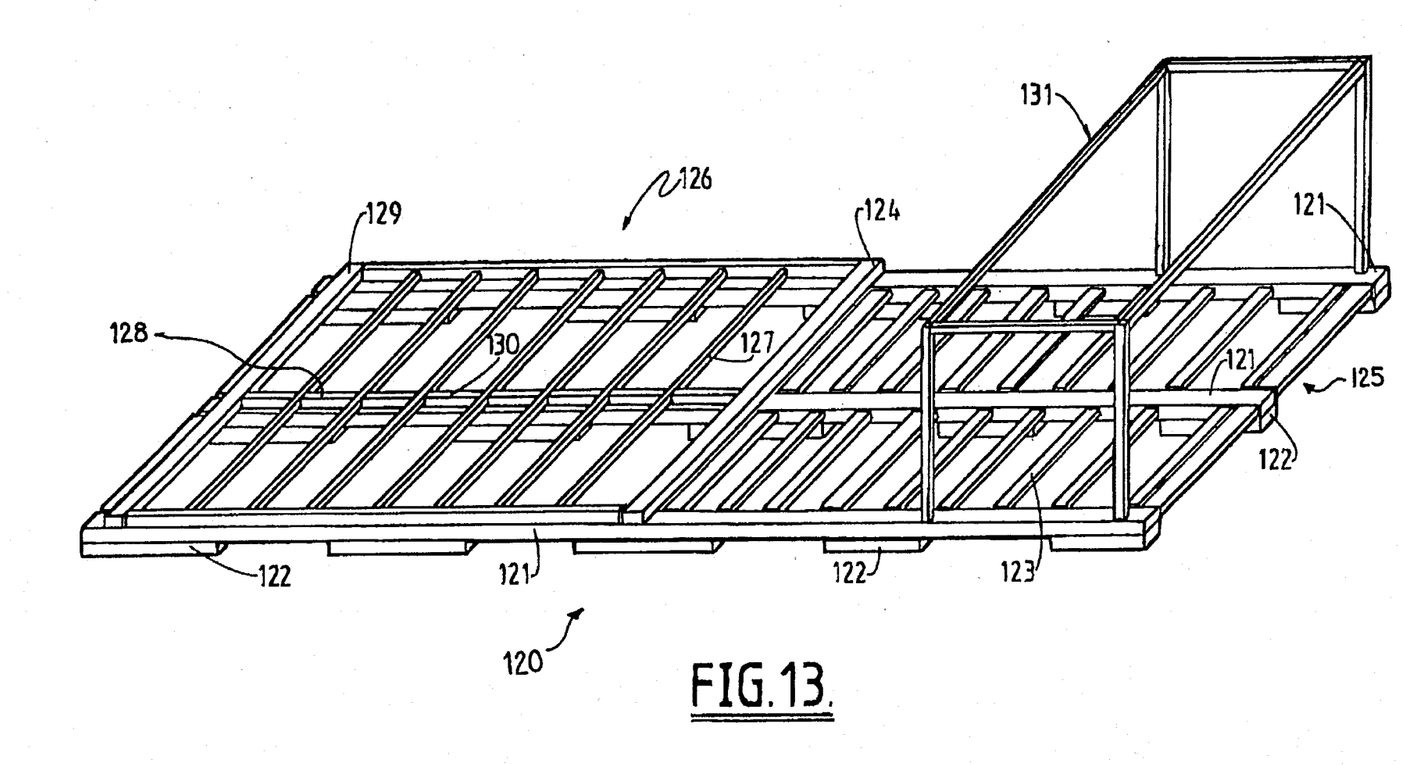
FIG. 13 is a perspective view of a common support base for both a holding tank assembly and a filter tank assembly.
Figure 14:
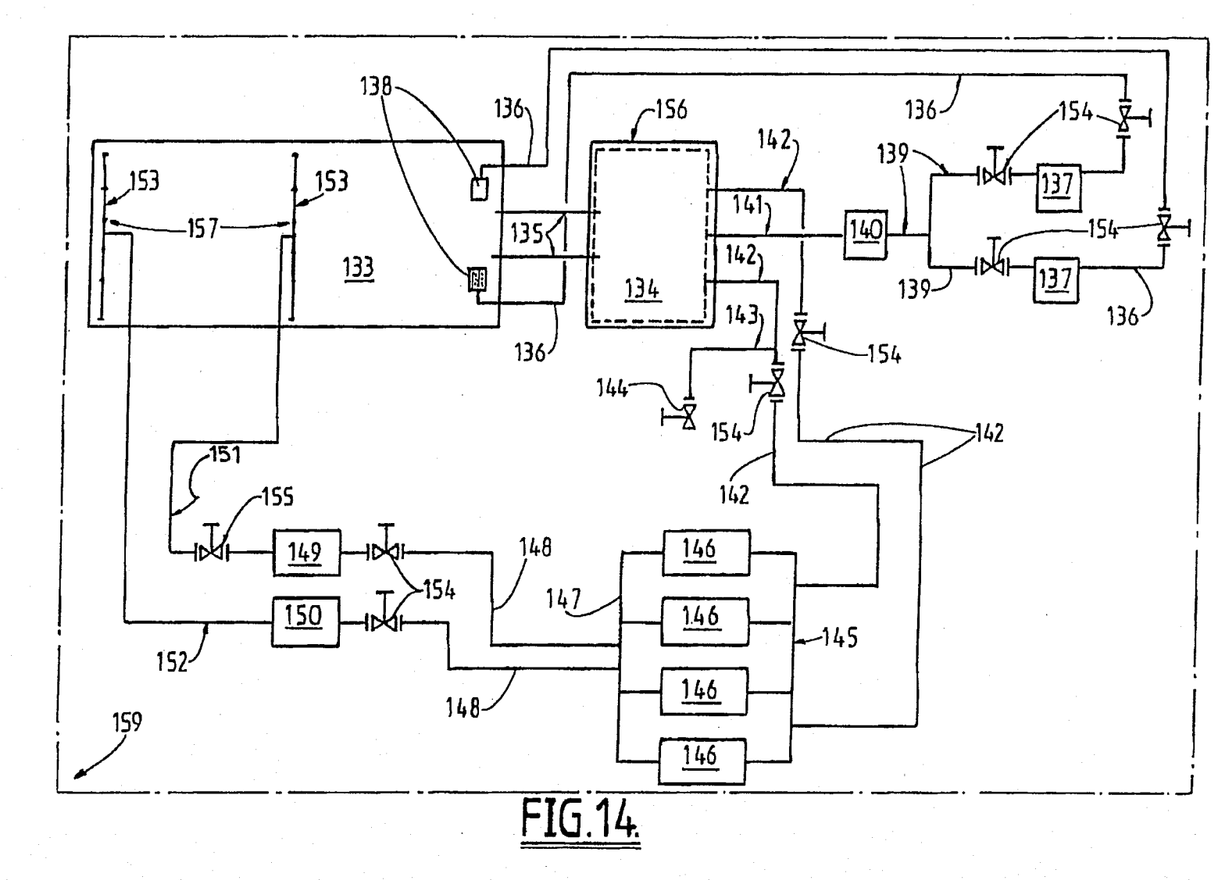
FIG. 14 is a schematic view of a holding tank system including a holding tank assembly, filter tank assembly and associated water conditioning means for support on the common support shown in FIG. 13.
Figure 15:
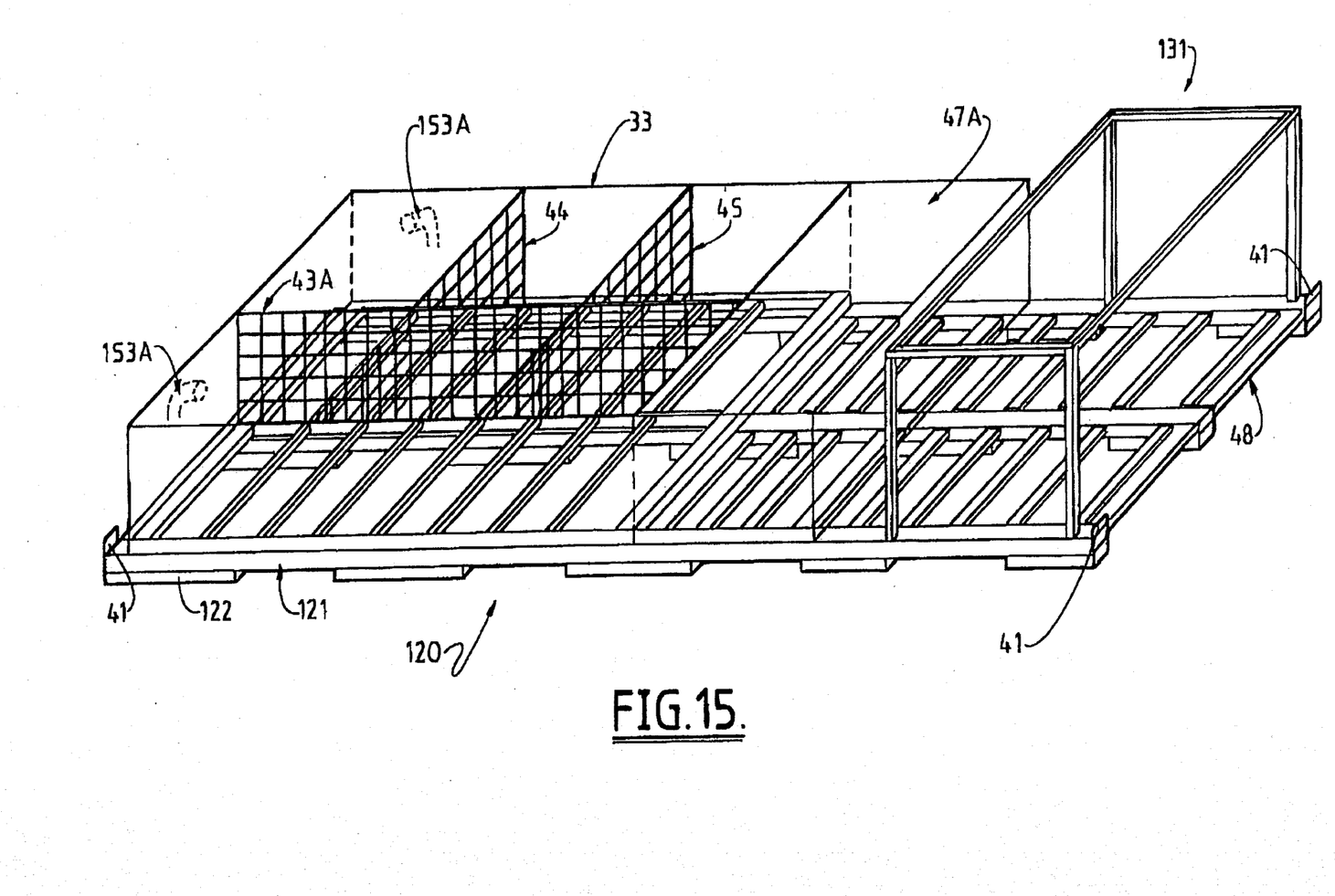
FIG. 15 is a perspective view of a holding tank assembly supported on the support base shown in FIG. 13.

A preferred arrangement of the above described holding tank assembly is shown in FIGS. 13–15.

In FIG. 13 the mounting frame or base 120 includes a plurality of longitudinal base frame members 121 supported on support blocks 122. Frame members 121 are interconnected by cross members 123. A transverse frame member 124 separates the mounting frame into sub frames 125 and 126. Sub frame 126 includes cross members 127 which interconnect longitudinal frame members 128. There is also shown end frame member 129 and frame members 130 located between cross members 127. There is also shown frame structure 131 for forming a housing for water conditioning apparatus.

In FIG. 14 the holding tank assembly 159 supportable on mounting base 120 includes holding tank 133, filter tank 134, lines 135 interconnecting holding tank 133 and filter tank 134, skimmer outlets 136, activated carbon filters 137, base outlet strainers 138, carbon suction 139, pumps 140, 149 and 150, discharge lines 141 151 and 152, suction lines 142 and 148, refrigeration water manifolds 145, 147, refrigerator evaporator housings 146, discharge ball valves 155, drain ball valve 144 and associated line 143, isolation ball valves 154 water injector manifolds 153, pre filter media 156 and water injectors 157.

In FIG. 15 there is shown holding tank assembly 159 mounted on mounting frame 120. Attachment points 41 are also shown for crane books (not shown). The holding tank 133 includes mesh screens 43A, 44 and 45 and water injectors 153A. Housing 47A is also shown for the filter tank 134. Also shown are longitudinal recesses 48 for inlet conduits (T) suction conduits SU and skimmer conduits (SK) already shown in FIG. 2.

Figure 16:
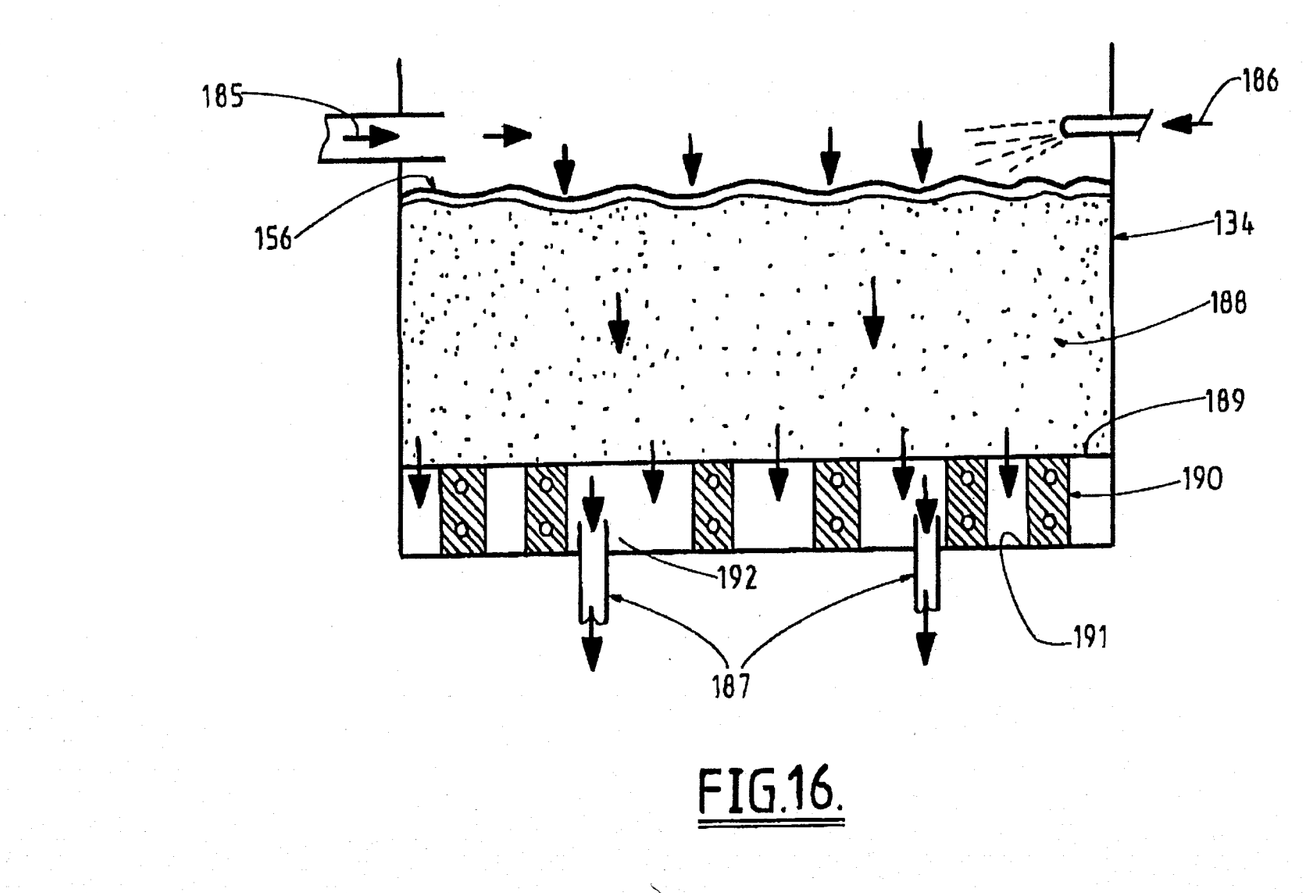
FIG. 16 is a schematic view of a filter tank assembly for support on the support base shown in FIG. 13.

In FIG. 16 there is shown a detailed view of filter tank 134 having inlets 185 which are the skimmer inlets and 186 which is the discharge line coming from the carbon pump, and outlet tubes 187.

A layer of shell grit 188 is supported on perforated tray 189 which is supported on perforated upstands 190 bonded to the base surface 191 of tank 134. Above the layer of shellgrit lays a prefilter media 156 which catches ocean sediments before it enters the filter bed. This in turn keeps maintenance of thew filter bed to a minimum by periodically removing the prefilter, washing and placed back on top of the filter bed. At the base of the filter tank underneath the filter tray, there is a water body space 192. This ensures 100 per cent utilisation of the filter bed without causing any dead spots of bacteria to form. Also it allows a clear flow of water to enter the pumps and finally by having the outlets 187 elevated above the base surface 191 it allows any sediments to accumulate at the base surface 191 and therefore the balance of the system is not disturbed.

From the foregoing it will be appreciated that the holding tank system of the invention is readily transportable by providing a transportable base or frame for both the holding tank assembly as well as the filter tank assembly and also a housing for the water conditioning means. This means that installation can be carried out in minimal time because the transportable base or frame is an integral part of the holding tank system of the invention when it is installed. The transportable base or frame may also function as a skid so that it may readily be shifted from one location to another without any dismantling being necessary.

The holding tank system of the invention once placed in desired location in a factor or retail establishment mounted on its mounting frame or mounting base only requires that the holding tank be filled with water and also that the holding tank system be electrically connected to an appropriate power source before becoming operational which is in distinct contrast with the prior art.

Another advantage of the present invention is that the holding system may be fabricated in its entirety prior to delivery to the installation site which enables quality control procedures or quality control management systems to be fully utilised prior to delivery.

The invention also includes within its scope a method of installation of a holding tank system which includes the steps of (i) mounting the holding tank assembly onto transportable support means, and (ii) installing the holding tank assembly at an installation site so that the transportable support means supports the holding tank assembly and this forms part of the holding tank system.

I claim:

1. A holding tank system for storage of live seafood comprising:
   (i) a holding tank assembly;
   (ii) a transportable support base for said holding tank assembly, said support base having a plurality of longitudinal frame members and a plurality of transverse frame members interconnecting said longitudinal frame members; and
   (iii) a plurality of conduits located beneath said support base for liquid communication with said holding tank assembly.

2. A holding tank assembly as claimed in claim 1 further comprising a filter tank assembly supported by said transportable support base.

3. A holding tank system as claimed in claim 2 wherein said conduits provide liquid communication between said holding tank assembly and said filter tank assembly.

4. A holding tank assembly as claimed in claim 3 wherein said filter tank assembly includes a forward line and a return line and said holding tank assembly includes a water conditioning circuit having a suction line connected to said forward line and said return line of said filter tank assembly.

5. A holding tank system as claimed in claim 1 including an additional transportable support base which supports a filter tank assembly.

6. A holding tank assembly as claimed in claim 1 further comprising a housing for water conditioning apparatus supported by said transportable support base.

7. A holding tank system as claimed in claim 6 wherein the water conditioning apparatus includes a pump, water filters and cooling apparatus inclusive of refrigeration assemblies.

8. A holding tank system as claimed in claim 1 wherein the transportable support base includes a plurality of attachment points for location of crane hooks.

9. A holding tank system as claimed in claim 1 wherein the support base includes a plurality of longitudinal recesses for accommodation of said conduits.

10. A holding tank system as claimed in claim 1 wherein the transportable support base includes a plurality of longitudinal recesses located between adjacent frame members for accommodations of said conduits.

11. A holding tank system as claimed in claim 1 wherein the conduits include a suction line, a skimmer line and an inlet line.

12. A holding tank system as claimed in claim 1 further comprising a water conditioning apparatus for conditioning water flowing between the holding tank assembly and the filter tank assembly wherein water flows through the filter tank assembly in a first direction when the water conditioning apparatus is in a normal operative cycle and in a second, opposite direction when the water conditioning apparatus is in a wash cycle to wash the filtering material contained in the filter tank assembly to ensure an unrestricted flow of water through the filter tank assembly.

13. A method installation of a holding tank system at an installation site, the holding tank system including a hold tank assembly having a plurality of conduits, the method comprising the steps of:

(i) mounting the holding tank assembly onto a transportable support base having a plurality of longitudinal recesses for accommodating the plurality of conduits of the holding tank assembly beneath said transportable support base; and
   (ii) installing the transportable support base at the installation site whereby the transportable support base forms a permanent part of the holding tank system.

14. A method of installation as claimed in claim 13 wherein in step (i) a filter tank assembly is also mounted on the transportable support base.

15. A method of installation as claimed in claim 14 wherein in step (i) a housing for water conditioning apparatus is also mounted on the transportable support base.

16. A method in installation as claimed in claim 15 wherein the holding tank assembly and the filter tank assembly are mounted on separate transportable support bases.

17. A method of installation as claimed in claim 16 wherein the holding tank assembly and the filter tank assembly are interconnected so that water may flow between the holding tank assembly and the filter tank assembly for conditioning of said water at the installation site.

18. A method of installation as claimed in claim 17 wherein a forward line and a return line of the filter tank assembly is connected to a suction line of a water conditioning circuit of the holding tank assembly.

19. A method of installation as claimed in claim 14 wherein the holding tank assembly and the filter tank assembly are mounted on a common transportable support base.

20. A holding tank system comprising:
   (i) a holding tank assembly;
   (ii) a filter tank assembly
   (iii) a transportable support base for supporting the holding tank assembly and the filter tank assembly, the support base including a plurality of longitudinal recesses having a plurality of conduits located therebeneath for providing liquid communication between the holding tank assembly and the filter tank assembly; and
   (iv) water conditioning apparatus for conditioning water flowing between the holding tank assembly and the filter tank assembly wherein water flows through the filter tank assembly in a first direction when the water conditioning apparatus is in a normal operative cycle and in a second, opposite direction in a wash cycle to wash the filtering material contained in the filter tank assembly to ensure an unrestricted flow of water through the filter tank assembly.

21. A holding tank system for storage of seafood comprising:

a holding tank assembly;
   a transportable support base for said holding tank assembly, said support base including a plurality of longitudinal recesses; and
   a plurality of conduits located beneath said support base in said longitudinal recesses for liquid communication with said holding tank assembly.

* * * * *